US012458400B2

(12) United States Patent
Holbrooks et al.

(10) Patent No.: US 12,458,400 B2
(45) Date of Patent: Nov. 4, 2025

(54) DISTAL TIPS OF SURGICAL TOOLS AND RELATED METHODS

(71) Applicant: CooperSurgical, Inc., Trumbull, CT (US)

(72) Inventors: Ashley Holbrooks, New Haven, CT (US); Patrick N. Gutelius, Monroe, CT (US); Fabio Pinto, Stamford, CT (US); Gary Helstern, Newtown, CT (US)

(73) Assignee: CooperSurgical, Inc., Trumbull, CT (US)

( * ) Notice: Subject to any disclaimer, the term of this patent is extended or adjusted under 35 U.S.C. 154(b) by 1035 days.

(21) Appl. No.: 17/482,523

(22) Filed: Sep. 23, 2021

(65) Prior Publication Data

US 2022/0133355 A1 May 5, 2022

Related U.S. Application Data

(60) Provisional application No. 63/107,078, filed on Oct. 29, 2020.

(51) Int. Cl.
*A61B 17/42* (2006.01)
*A61B 17/00* (2006.01)

(52) U.S. Cl.
CPC ...... *A61B 17/4241* (2013.01); *A61B 2017/00557* (2013.01); *A61B 2017/00738* (2013.01); *A61B 2017/00862* (2013.01); *A61B 2017/00955* (2013.01)

(58) Field of Classification Search
CPC ... A61B 17/12136; A61B 2017/00557; A61M 25/1002; A61M 25/1025; A61M 25/1027; A61M 25/1034; A61M 25/1036; A61M 25/104; A61M 2025/1043
See application file for complete search history.

(56) References Cited

U.S. PATENT DOCUMENTS

| 4,177,815 A | * | 12/1979 | Patel | A61M 25/1034 604/103 |
| 5,836,965 A | * | 11/1998 | Jendersee | A61F 2/958 606/198 |
| 9,636,144 B2 | | 5/2017 | Parys et al. | |

(Continued)

OTHER PUBLICATIONS

International Preliminary Report on Patentability in International Appln. No. PCT/US2021/051791, mailed on May 2, 2023, 9 pages.

(Continued)

*Primary Examiner* — Martin T Ton
(74) *Attorney, Agent, or Firm* — Fish & Richardson P.C.

(57) ABSTRACT

A distal tip of a surgical tool includes a tip body and an expandable member that extends around the tip body. The tip body defines an end portion that defines an attachment surface and an elongate member that is configured to be inserted within a tubular shaft of the surgical tool. The elongate member also defines a recessed channel that terminates at the end portion. The expandable member is secured to the attachment surface with a chemical bond and is adjustable between an expanded configuration in which at least a portion of the expandable member extends radially outward from the tip body and a collapsed configuration in which at least the portion of the expandable member is oriented substantially parallel to the tip body.

29 Claims, 12 Drawing Sheets

(56) References Cited

U.S. PATENT DOCUMENTS

| | | | |
|---|---|---|---|
| 9,649,130 B2 | 5/2017 | Parys | |
| 9,743,956 B2 | 8/2017 | Parys et al. | |
| 9,788,859 B2 | 10/2017 | Parys | |
| 10,695,092 B2 | 6/2020 | Wu et al. | |
| 2005/0171591 A1* | 8/2005 | McHale | A61M 25/0052 606/191 |
| 2007/0270645 A1* | 11/2007 | Ikeda | A61B 1/12 600/116 |
| 2012/0245521 A1* | 9/2012 | Gulachenski | A61M 25/1036 604/103.09 |
| 2013/0253622 A1* | 9/2013 | Hooven | A61B 18/14 607/101 |
| 2016/0100861 A1 | 4/2016 | Parys et al. | |
| 2016/0100862 A1 | 4/2016 | Parys | |
| 2017/0189066 A1 | 7/2017 | Parys et al. | |
| 2017/0209173 A1 | 7/2017 | Parys | |
| 2017/0325844 A1 | 11/2017 | Prior | |
| 2019/0224459 A1* | 7/2019 | Pedroni | A61M 25/10 |
| 2019/0254708 A1* | 8/2019 | Wu | A61B 17/4241 |
| 2019/0321079 A1 | 10/2019 | Dasilva et al. | |
| 2022/0032016 A1* | 2/2022 | Connolly | A61M 25/005 |

OTHER PUBLICATIONS

The International Search Report and Written Opinion of the International Searching Authority for International Application No. PCT/US2021/051791 dated Jan. 4, 2022.

* cited by examiner

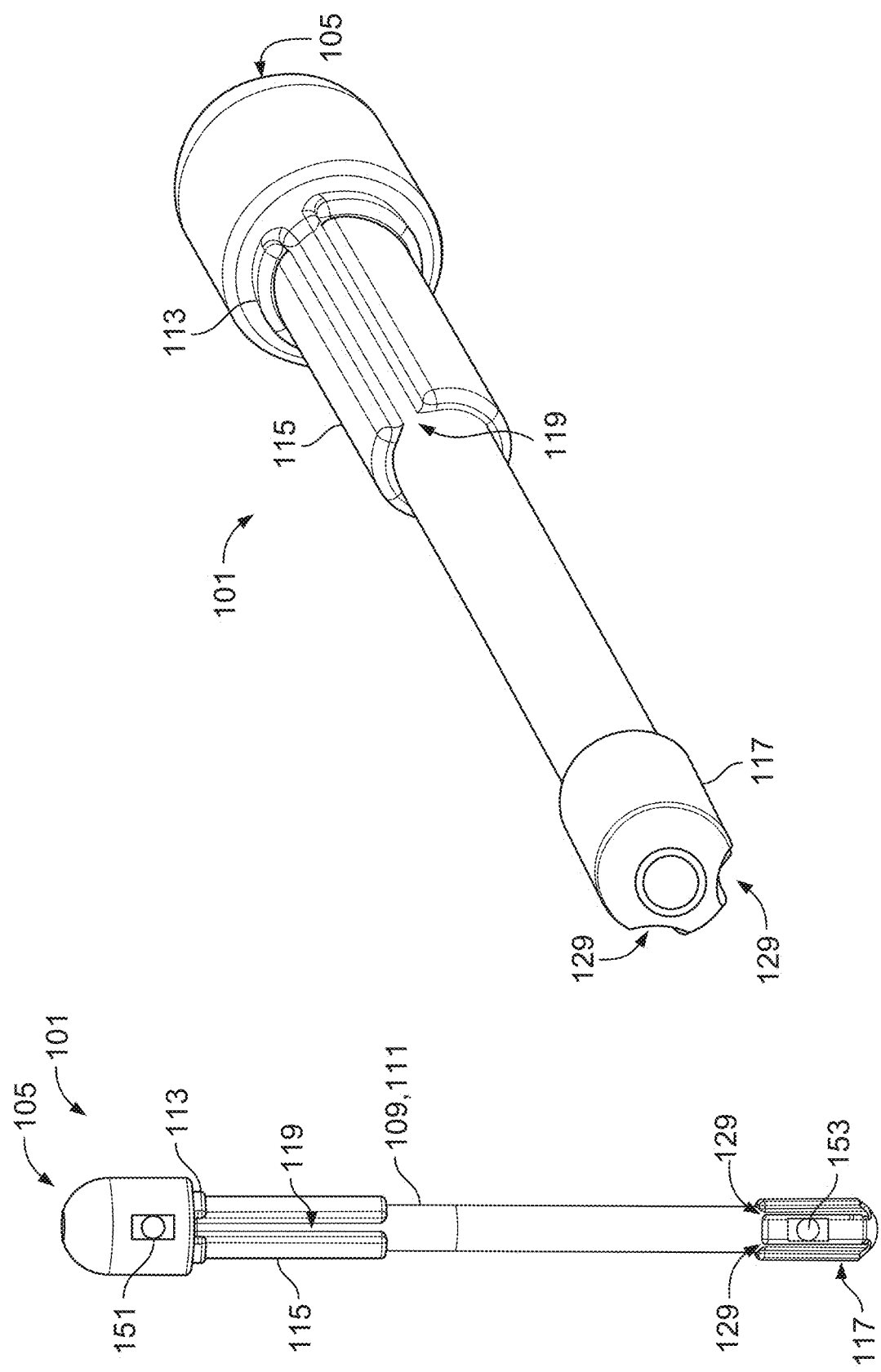

DISTAL TIPS OF SURGICAL TOOLS AND RELATED METHODS

CROSS-REFERENCE TO RELATED APPLICATIONS

This application claims priority to U.S. Provisional Patent Application No. 63/107,078, filed on Oct. 29, 2020. The entire content of this application is incorporated herein by reference.

TECHNICAL FIELD

This disclosure relates to distal tips of surgical tools, such as uterine manipulators, and related methods of operating such surgical tools.

BACKGROUND

Uterine manipulators are medical instruments that are used for manipulating (e.g., moving or repositioning) a patient's uterus during medical procedures. Such procedures include surgical procedures, such as laparoscopic gynecologic surgery (e.g., total laparoscopic hysterectomy (TLH) surgery). Instruments of this kind often include a proximal portion that remains external to the patient's body during use and a distal portion that is inserted into the patient's body. The proximal portion typically provides for manipulation of the instrument during use. The distal portion often includes a tip that is sized to be inserted into and/or engage the uterus. Generally, the distal portion of the instrument is advanced through the vaginal cavity and into the uterus. With the distal portion inserted within a uterus, the uterus can be manipulated through surgeon-controlled or physician-controlled movements of the proximal portion. Following completion of a procedure, the instrument is removed from the patient's body via the vaginal cavity.

SUMMARY

In general, this disclosure relates to distal tips of surgical tools (e.g., uterine manipulators) and related methods of operating such surgical tools. In an example embodiment, a uterine manipulator including any of the distal tips disclosed herein can be used for manipulating a patient's uterus during gynecological surgical and/or diagnostic procedures.

In one aspect, a distal tip of a surgical tool includes a tip body and an expandable member that extends around the tip body. The tip body defines an end portion that defines an attachment surface and an elongate member that is configured to be inserted within a tubular shaft of the surgical tool. The elongate member also defines a recessed channel that terminates at the end portion. The expandable member is secured to the attachment surface with a chemical bond and is adjustable between an expanded configuration in which at least a portion of the expandable member extends radially outward from the tip body and a collapsed configuration in which at least the portion of the expandable member is oriented substantially parallel to the tip body.

Embodiments may include one or more of the following features.

In some embodiments, the expandable member includes an overmolded structure.

In some embodiments, the expandable member is made at least in part of silicone.

In some embodiments, the chemical bond includes an overmolded bond.

In some embodiments, the expandable member includes an elastomeric material.

In some embodiments, the expandable member includes a thermoplastic elastomer (TPE) material.

In some embodiments, the end portion defines an atraumatic profile.

In some embodiments, the attachment surface has a round shape.

In some embodiments, the expandable member includes an inflatable balloon.

In some embodiments, the expandable member and the tip body together define an annular interior region sized to accommodate a distal portion of the tubular shaft.

In some embodiments, the expandable member has a U-shaped cross-sectional profile in the collapsed configuration.

In some embodiments, the elongate member of the tip body defines an annular sidewall that is sized to form a slip fit with an inner surface of the tubular shaft.

In some embodiments, the annular sidewall at least in part defines the recessed channel.

In some embodiments, the annular sidewall forms an abutment surface against which a distal portion of the tubular shaft is positioned at an end of the recessed channel.

In some embodiments, the annular sidewall is a first annular sidewall, and the elongate member of the tip body defines a second annular sidewall that is axially spaced from the first annular sidewall and sized to form a slip fit with the inner surface of the tubular shaft.

In some embodiments, the recessed channel is a first recessed channel, and the second annular sidewall at least in part defines a second recessed channel.

In some embodiments, the second recessed channel is angularly offset from the first recessed channel.

In some embodiments, the elongate member of the tip body further defines a rod that extends from the annular sidewall, and a diameter of the rod is less than a diameter of the annular sidewall.

In some embodiments, the recessed channel is oriented parallel to a central axis of the tip body.

In some embodiments, the tip body defines an axial through channel.

In some embodiments, the expandable member is invertible with respect to the attachment surface.

In some embodiments, the end portion has a tapered shape.

In another aspect, a surgical tool includes a tubular shaft and a distal tip that is secured to the tubular shaft. The distal tip includes a tip body and an expandable member that extends around the tip body. The tip body defines an end portion that defines an attachment surface and an elongate member that is configured to be inserted within a tubular shaft of the surgical tool. The elongate member also defines a recessed channel that terminates at the end portion. The expandable member is secured to the attachment surface with a chemical bond and is adjustable between an expanded configuration in which at least a portion of the expandable member extends radially outward from the tip body and a collapsed configuration in which at least the portion of the expandable member is oriented substantially parallel to the tip body.

Embodiments, may include one or more of the following features.

In some embodiments, the expandable member includes an overmolded structure.

In some embodiments, the expandable member is made at least in part of silicone.

In some embodiments, the chemical bond includes an overmolded bond.

In some embodiments, the expandable member includes an elastomeric material.

In some embodiments, the expandable member includes a TPE material.

In some embodiments, the end portion defines an atraumatic profile.

In some embodiments, the attachment surface has a round shape.

In some embodiments, the end portion and the attachment surface have a tapered shape.

In some embodiments, the expandable member includes an inflatable balloon.

In some embodiments, the expandable member and the tip body together define an annular interior region, and a distal portion of the tubular shaft is disposed within the annular interior region.

In some embodiments, the expandable member has a U-shaped cross-sectional profile in the collapsed configuration.

In some embodiments, the elongate member of the tip body defines an annular sidewall that forms a slip fit with an inner surface of the tubular shaft.

In some embodiments, the annular sidewall at least in part defines the recessed channel.

In some embodiments, the annular sidewall forms an abutment surface against which a distal portion of the tubular shaft is positioned at an end of the recessed channel.

In some embodiments, a distal end of the tubular shaft is abutted against the annular sidewall.

In some embodiments, the annular sidewall is a first annular sidewall that forms a first slip fit, and the elongate member of the tip body defines a second annular sidewall that is axially spaced from the first annular sidewall and that forms a second slip fit with the inner surface of the tubular shaft.

In some embodiments, the recessed channel is a first recessed channel, the second annular sidewall at least in part defines a second recessed channel, and the second recessed channel is angularly offset from the first recessed channel.

In some embodiments, the elongate member of the tip body further defines a rod that extends from the annular sidewall, and a diameter of the rod is less than a diameter of the annular sidewall.

In some embodiments, the surgical tool further includes a mechanical interlock that compresses a distal portion of the tubular shaft against the elongate member of the tip body to secure, at least in part, the distal tip to the tubular shaft.

In some embodiments, a proximal end region of the expandable member is secured to the tubular shaft with a joining or fastening feature.

In some embodiments, the surgical tool further includes a shrink tube that surrounds at least a distal portion the shaft and a proximal portion of the expandable member.

In some embodiments, the surgical tool further includes a fluid line that is coupled to a proximal end of the tubular shaft.

In another aspect, a uterine manipulator includes a tubular shaft and a distal tip that is secured to the tubular shaft. The distal tip includes a tip body and an inflatable member extending around the tip body. The tip body includes an end portion that defines an attachment surface and an elongate member that is configured to be inserted within the tubular shaft. The elongate member defines a recessed fluid channel that terminates at the end portion. The inflatable member is secured to the attachment surface with a chemical bond and is adjustable between an inflated configuration in which at least a portion of the inflatable member extends radially outward from the tubular shaft and a deflated configuration in which at least the portion of the inflatable member is oriented substantially parallel to the tubular shaft.

In another aspect, a method of operating a surgical tool includes flowing a fluid distally through a tubular shaft of the surgical tool to a distal tip of the surgical tool that is secured to a distal portion of the tubular shaft and flowing the fluid further distally along a recessed channel along an elongate member of a tip body of the distal tip, wherein the elongate member is disposed within the tubular shaft. The method further includes flowing the fluid further distally out of the tubular shaft through an opening positioned at an interface between an end portion of the tip body and the distal portion of the tubular shaft and capturing the fluid with an expandable member of the distal tip, wherein the expandable member extends around the tip body and is secured to an attachment surface on the end portion of the tip body with a chemical bond. The method further includes expanding the expandable member radially outward from the tubular shaft with the fluid.

Embodiments may provide one or more of the following advantages.

The over-molded design of the expandable member advantageously enables the expandable member to be securely attached to the tip body of the distal tip with only a single seal that is provided by the chemical bond (e.g., an overmolded bond). In contrast, conventional distal tip designs of uterine manipulators often require multiple glue joints for securing a distal expandable member to a shaft. Application of such glue joints is typically difficult to automate and also difficult to carry out in a manual assembly process in a repeatable and reliable manner.

Other aspects, features, and advantages will be apparent from the description, the drawings, and the claims.

DESCRIPTION OF DRAWINGS

FIG. 7 is a side view of a body of the distal tip of FIG. 5.

FIG. 8 is a bottom perspective view of the body of the distal tip of FIG. 5.

DETAILED DESCRIPTION

Figure 1:
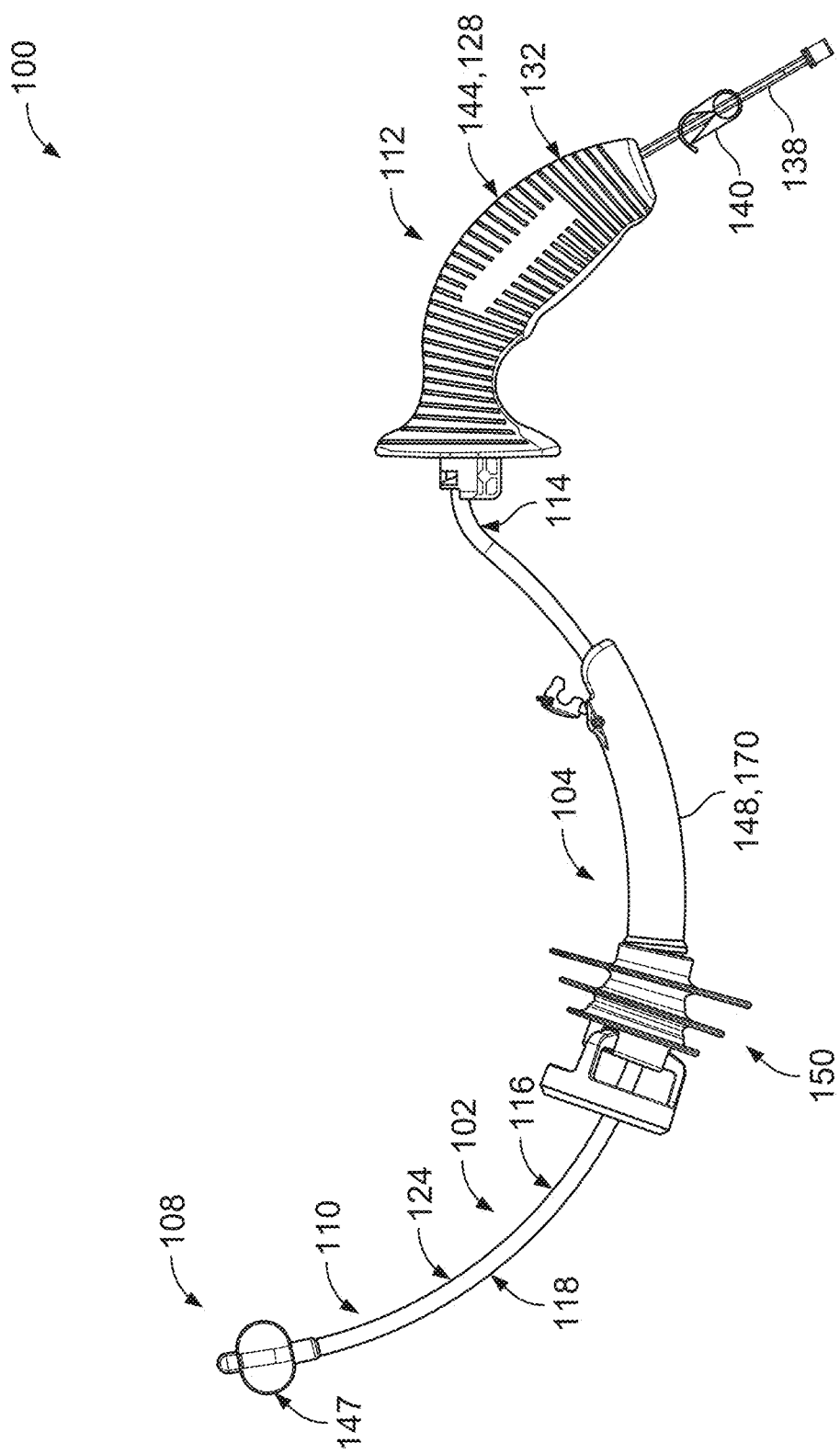
FIG. 1 is a side view of a uterine manipulator including an expandable member of a distal tip in an expanded configuration.
Figure 2:
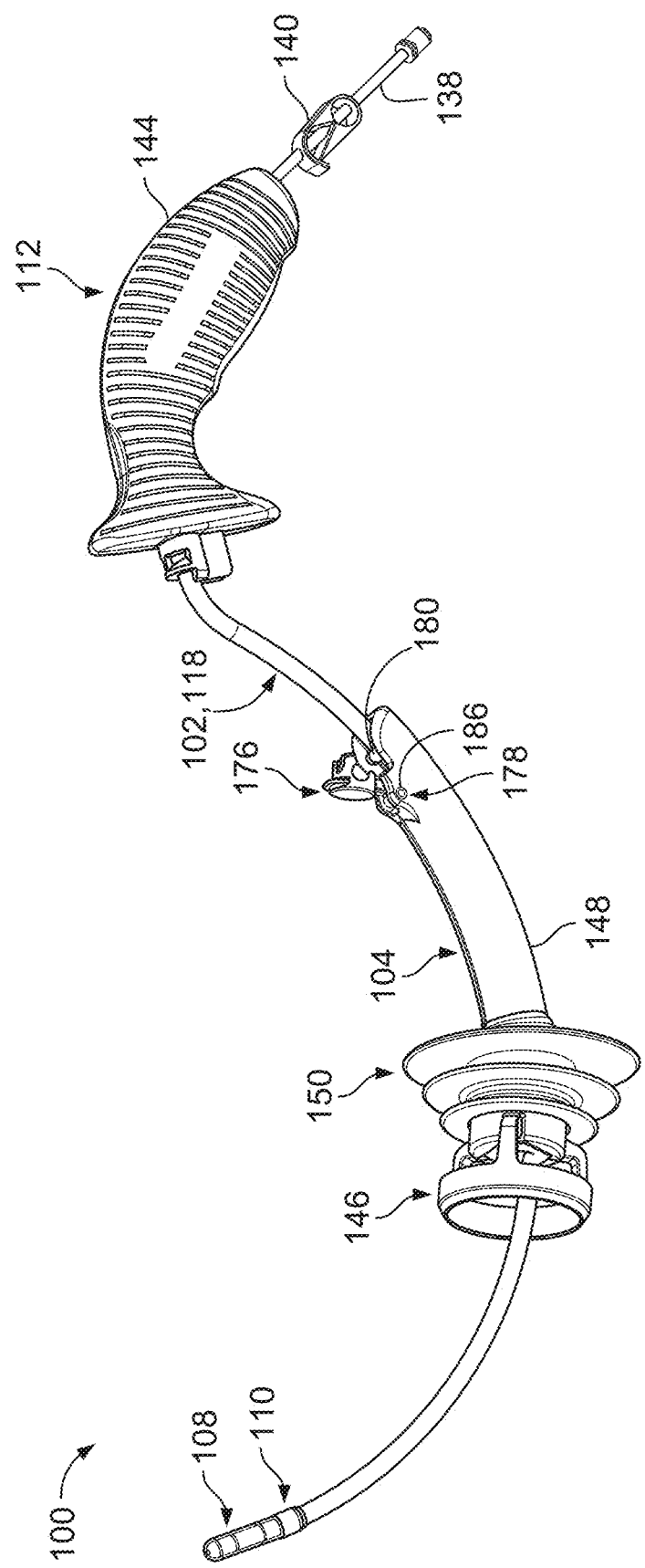
FIG. 2 is a perspective view of the uterine manipulator of FIG. 1 with the expandable member in a collapsed configuration.
Figure 3:
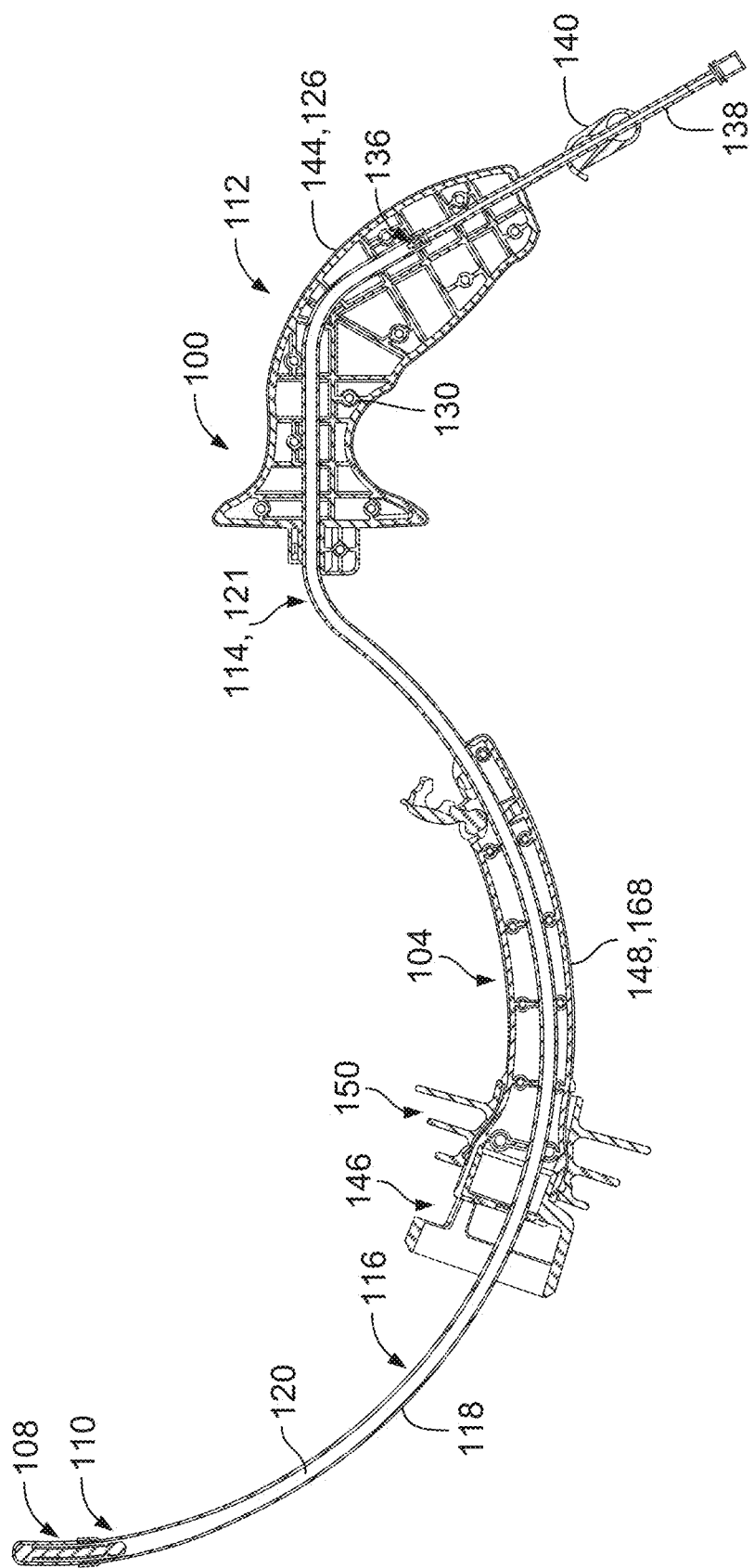
FIG. 3 is a side cross-sectional view of the uterine manipulator of FIG. 1 with the expandable member in the collapsed configuration.

FIGS. 1-3 illustrate a uterine manipulator 100 adapted for insertion into a vaginal cavity for use in female pelvic surgical procedures. The uterine manipulator 100 is a disposable (e.g., single-use) device. The uterine manipulator 100 includes a shaft 102 that is configured to extend through a patient's cervix for use in repositioning the patient's uterus and a colpotomizer assembly 104 that is disposed about the shaft 102 and configured to receive the cervix. The uterine manipulator 100 further includes a distal tip 108 that is attached to a distal portion 110 of the shaft 102, as well as a handle assembly 112 that is connected to a proximal portion 114 of the shaft 102. The uterine manipulator 100 also includes a vaginal occluder 150 that surrounds the colpotomizer assembly 104 for maintaining pneumoperitoneum within the patient's peritoneal cavity during a surgical procedure.

Referring particularly to FIG. 3, the shaft 102 of the uterine manipulator 100 is formed as a rigid cannula with several portions that have generally curved (e.g., arcuate) shapes. For example, in addition to the distal portion 110 to which the distal tip 108 is attached and the proximal portion 114 that extends into the handle assembly 112, the shaft 102 also includes a central portion 116 along which the colpotomizer assembly 104 is displaceable for engaging the cervix. The shaft 102 defines a central lumen 120 that allows passage of air between the handle assembly 112 and the distal tip 108.

Referring to FIG. 2, the central portion 116 and parts of the distal and proximal portions 110, 114 of the shaft 102 are surrounded by a shrink tube 118 that provides traction for locking the colpotomizer assembly 104 in a desired position along the shaft 102, as will be discussed in more detail below. A set of ruler markings 124 are printed across a distal portion of the shrink tube 118 and indicate a distance from the fundus of the uterus when the uterine manipulator 100 is appropriately, fully inserted into the uterus (e.g., when the distal tip 108 is positioned adjacent the fundus, as will be discussed in more detail with respect to FIG. 13). The ruler markings 124 may be provided in English units or metric units.

Referring again to FIG. 3, the portion of the shaft 102 that extends between the handle assembly 112 and the distal tip 108 typically has an arcuate length of about 31.8 cm to about 36.8 cm (e.g., about 34.9 cm). The same portion of the shaft 102 typically has a projected length of about 27.7 cm to about 31.5 cm (e.g., about 28.4 cm). A section 121 of the proximal portion 114 of the shaft 102 that extends from the handle assembly 144 typically has a radius of curvature of about 2.0 cm to about 3.0 cm (e.g., about 2.5 cm). The central and distal portions 116, 110 of the shaft 102 typically together have a radius of curvature of about 14.0 cm to about 16.5 cm (e.g., about 15.2 cm). The shaft 102 typically has an inner diameter of about 0.32 cm to about 0.34 cm (e.g., about 0.33 cm) and a wall thickness of about 1.35 mm to about 1.74 mm (e.g., about 1.61 mm).

The shaft 102 and the shrink tube 118 of the uterine manipulator 100 are formed (e.g., molded, extruded, drawn, and/or machined) from one or more materials that are biocompatible and capable of withstanding medical device sterilization procedures, such as chemical-based or heat-based sterilization procedures. In some embodiments, the shaft 102 may be made of one or more of 304 stainless steel, 304 stainless steel full hard, various other grades of stainless steel, stainless steels with various other hardness values, glass-filled plastics, and carbon fiber-filled plastics or other materials. Such materials can advantageously provide tactile feedback (e.g., resistance to movement of tissue) to the user of the uterine manipulator 100 as the shaft 102 is inserted or positioned within the patient. In some embodiments, the shrink tube 118 may be made of acrylated olefin or polytetrafluoroethylene (PTFE) and may have a shore durometer of about shore D25 to about shore D60 (e.g., about shore D53). Such a hardness can provide the shrink tube 118 with enough traction to lock the colpotomizer assembly 104 in a desired position.

Figure 4:
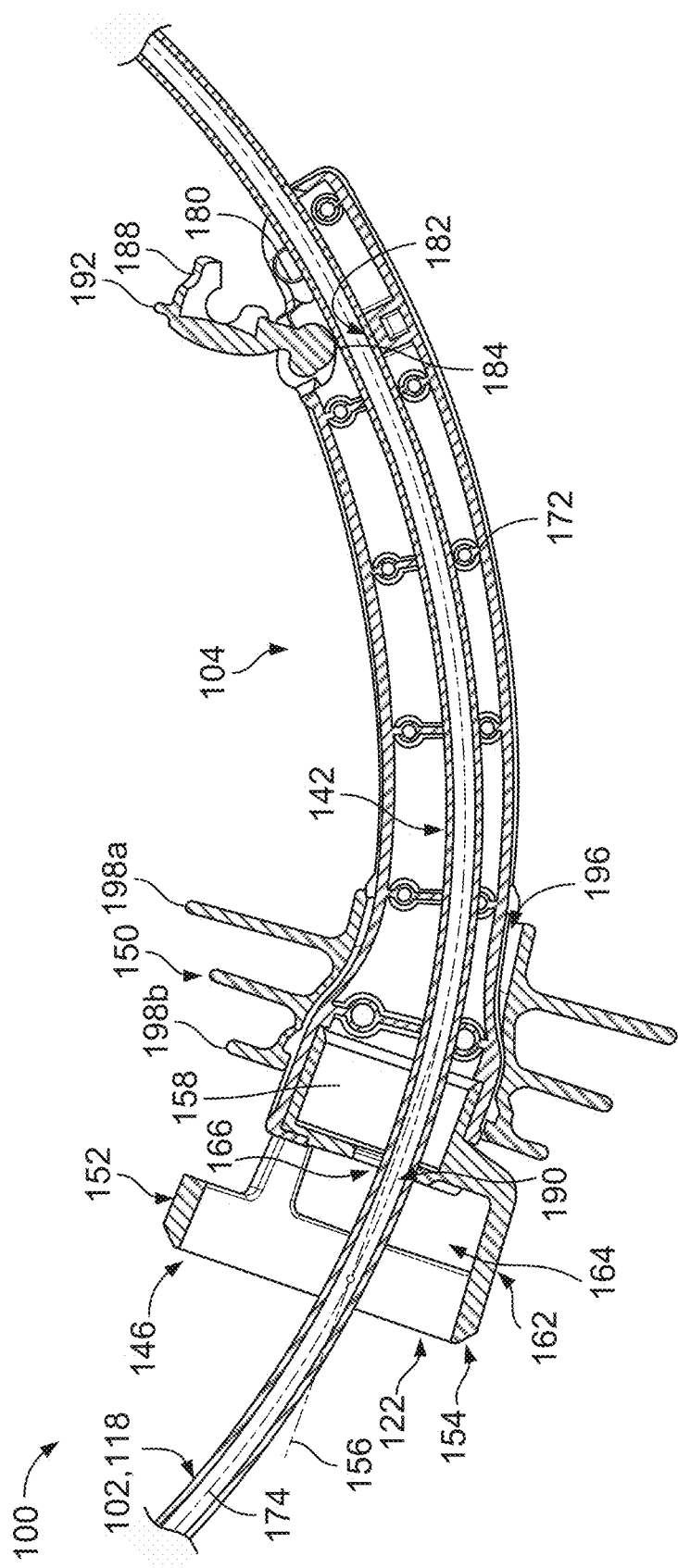
FIG. 4 is an enlarged side cross-sectional view of a colpotomizer assembly of the uterine manipulator of FIG. 1.

Referring to FIGS. 3 and 4, the colpotomizer assembly 104 is a displaceable assembly that can be slid along the shaft 102 of the uterine manipulator 100. The ability to displace the colpotomizer assembly 104 can allow for relatively quick, easy positioning of the distal tip 108 of the uterine manipulator 100 within the cervix. Once proper placement of the distal tip 108 has been visually confirmed, the colpotomizer assembly 104 can be advanced along the shaft 102 into engagement with the cervix. The colpotomizer assembly 104 includes a colpotomizer cup 146 adapted to receive the cervix, a sleeve 148 that is connected to the colpotomizer cup 146 and that can be grasped for moving the colpotomizer assembly 104, and a vaginal occluder 150 disposed about a distal region 196 of the sleeve 148.

The colpotomizer cup 146 includes a generally cylindrical body 152, a base 158 that is spaced apart from the body 152, and three projections 162 that extend between the body 152 and the base 158. The projections 162 are spaced substantially equally around the body 152 and define three viewing windows 164. The body 152 defines a beveled rim 154 at a distal edge to provide an anatomical landmark and an incision backstop during use of the uterine manipulator 100. The base 158 of the colpotomizer cup 146 defines an opening 166 that is sized to allow passage of the shaft 102.

The sleeve 148 extends proximally from the base 158 of the colpotomizer cup 146 and has an arcuate shape that generally follows the shape of the central portion 116 of the shaft 102. The sleeve 148 is formed as a clam shell structure that includes a female portion 168 and a male portion 170. The female and male portions 168, 170, respectively, include multiple receptacles 172 (e.g., hexagonal or round-shaped receptacles) and multiple pins (e.g., round or cylindrical shaped pins) positioned along peripheral edges and aligned to mate with each other to secure the female and male portions 168, 170 together. The female and male portions 168, 170 together define a channel 142 through which the shaft 102 extends.

At a proximal end, the sleeve 148 includes a thumb lock 176, opposing receptacles 178 (e.g., through openings) that receive the thumb lock 176, opposing projections 180 to which the thumb lock 176 can be snap fitted, and a guide surface 182 that guides a radial position of the sleeve 148 about the shaft 102 and supports the shaft 102 for contact with the thumb lock 176. The thumb lock 176, receptacles 178, projections 180, and guide surface 182 together provide a quick, one-handed locking mechanism that allows the colpotomizer assembly 104 to be locked into a desired position along the shaft 102.

The thumb lock 176 includes a cam roller 184 adapted to contact the shrink tube 118 surrounding the shaft 102 to lock the colpotomizer assembly 104 into a selected position along the shaft 102. In particular, the radius of the cam roller 184 is variable (e.g., extending radially beyond a minimum circumference of the cam roller 184 along certain portions of the cam roller 184), such that the cam roller 184 compresses (e.g., digs into) the shrink tube 118 as the cam roller 184 is rotated towards the shaft 102 of the uterine manipulator 100. The thumb lock 176 further includes opposing pins 186 that extend from the cam roller 184 for mounting within the receptacles 178, a jaw 188 extending from the cam roller 184, and a lift flange 192 extending proximally from the jaw 188. The thumb lock 176 is rotatable with respect to the sleeve 148 via the arrangement provided by the pins 186 and receptacles 178.

The thumb lock 176 allows the colpotomizer assembly 104 to be locked into a desired position using an easy, one-handed technique that can be carried out with the same hand that moves the colpotomizer assembly 104 along the shaft 102. When the lift flange 192 is pushed downward (e.g., by the user's thumb) towards the shaft 102 to place the thumb lock 176 in a closed configuration (refer to FIG. 14), rotation of the cam roller 184 causes the cam roller 184 to dig into the shrink tube 118, thereby generating friction that locks the sleeve 148 of the colpotomizer assembly 104 in position along the shaft 102. Accordingly, the cam roller 184 of the thumb lock 176 is configured to apply a compressive load to the shaft 102. Such downward force applied to the lift flange 192 also causes the jaw 188 to snap fit onto the projections 180. When the lift flange 192 is pushed upward (e.g., by the user's thumb) away from the shaft 102 to place the thumb lock 176 in an open configuration (refer to FIGS. 1-3), rotation of the cam roller 184 releases the shrink tube 118, thereby unlocking the sleeve 148 of the colpotomizer assembly 104 with respect to the shaft 102. Such upward force applied to the lift flange 192 also causes the jaw 188 to separate from the projections 180. The thumb lock 176 provides the user with the ability to lock the colpotomizer assembly 104 at various different positions along the shaft 102 of the uterine manipulator 100.

Still referring to FIGS. 3 and 4, the colpotomizer assembly 104 of the uterine manipulator 100 has a geometry (e.g., provided by the position and size of the opening 166 of the base 158) that ensures proper alignment of a cup face 122 of the colpotomizer cup 146 with respect to the shaft 102. The cup face 122 is oriented perpendicular to an axial centerline 156 of the colpotomizer cup 146. A centerpoint 160 of the cup face 122 (located along the axial centerline 156 of the colpotomizer cup 146) is maintained along an arch centerline 174 of the shaft 102 as the colpotomizer assembly 104 is slid along the shaft 102. Such alignment of the cup face 122 with the arch centerline 174 is provided by an offset (e.g., oriented perpendicular to the centerline 156) between the centerline 156 of the colpotomizer cup 146 and the arch centerline 174 of the shaft 102, at the location of the opening 166 of the base 158 of the colpotomizer cup 146. The offset 190 is typically a distance of about 1.65 mm to about 2.16 mm (e.g., about 1.80 mm).

The colpotomizer cup 146 is substantially prevented from tilting with respect to the shaft 102 by points of contact between the cup 146 and the shaft 102 at the opening 166 of the base 158 and points of contact between the guide surface 182 and the shaft 102 beneath the cam lock 184 of the thumb lock 176. Aligning the colpotomizer cup 146 with respect to the shaft 102 in this manner ensures that an appropriately angled cutting edge is achieved for guiding a cutting of the uterus with an even distribution of tissue when the cervix is received within the colpotomizer cup 146. In other words, this configuration can help to ensure that substantially the same amount of cervical tissue is received in the colpotomizer cup 146 about the entire circumference of the shaft 102, and thus can help to ensure that a symmetrical cut is made to the cervix during a surgical procedure, such as a hysterectomy.

The various components of the colpotomizer assembly 104 are formed (e.g., molded and/or machined) from one or more materials that are biocompatible. In some embodiments, the colpotomizer cup 146 may be made of polyetherimide (PEI), a thermoplastic elastomer (TPE), or other thermoplastics or thermoset materials. In some embodiments, the female and male portions 168, 170 of the sleeve 148 may be made of acrylonitrile butadiene styrene (ABS), polycarbonate, or other suitable plastics. In some embodiments, certain components of the thumb lock 176 (e.g., the cam roller 184, the pins 186, the jaw 188, and the lift flange 192) may be made of polycarbonate. In some embodiments, the colpotomizer cup 146 and the sleeve 148 are formed (e.g., molded) as separate items that can then be connected together (e.g., via press fit or snap fit). This two-piece construction can allow cup bodies of different sizes (e.g., different diameters) to be used with the same sleeve.

Referring to FIGS. 1-3, the vaginal occluder 150 includes a tubular body 194 with a generally frustoconical exterior shape profile that is mounted about the distal region 196 of the sleeve 148. The vaginal occluder 150 further includes annular-shaped flanges 198 that extend radially from the tubular body 194. The flanges 198 have a variable diameter that gradually decreases in the distal direction. For example, the proximal-most flange 198*a* typically has a diameter of about 5.8 cm to about 6.4 cm (e.g., about 6.1 cm), while the distal-most flange 198*b* typically has a diameter of about 3.8 cm to about 4.4 cm (e.g., about 4.1 cm). The vaginal occluder 150 is a flexible structure that seals against the wall of the vaginal cavity to help maintain pneumoperitoneum during an operation. In some embodiments, the vaginal occluder 150 may be made of medical grade silicone, polyvinyl chloride (PVC), or a TPE.

Still referring to FIGS. 1-3, the handle assembly 112 includes a handle 144 that is formed as a clam shell structure including a female portion 126 and a male portion 128. The female and male portions 126, 128, respectively, include multiple receptacles 130 (e.g., hexagonal shaped receptacles) and multiple pins (e.g., round or cylindrical shaped pins) positioned along interior walls and aligned to mate with each other to hold the female and male portions 126, 128 together. The female and male portions 126, 128 of the handle 144 also define multiple gripping features in the form of ridges 132 that enable the user of the uterine manipulator 100 to ergonomically grip the handle 144. The handle 144 is formed (e.g., molded and/or machined) of one or more materials that are biocompatible and capable of withstanding medical device sterilization procedures, such as chemical-based or heat-based sterilization procedures. For example, in some embodiments, the handle 144 is made of polycarbonate or ABS.

In addition to the handle 144, the handle assembly 112 further includes a fluid line 138 (e.g., a tubular conduit) for injecting air into and removing air from the central lumen 120 of the shaft 102 to expand and collapse an expandable member 103 of the distal tip 108 that is in fluid communication with the central lumen 120. The fluid line 138 is securely connected to the proximal portion 114 of the shaft 102 with a fitting 134 (e.g., a barb fitting). The fluid line 138 is equipped with a connector 136 for attachment to a fluid source (e.g., an air source) and a clamp 140 for closing off the fluid line 138 to maintain a desired air pressure within the expandable member 103, which is located at the distal portion 110 of the shaft 102.

Referring to FIGS. 5-12, the distal tip 108 is securely connected to the distal portion 110 of the shaft 102. Referring particularly to FIGS. 5-8, the distal tip 108 includes a rigid, elongate tip body 101 and an expandable member 103 that is attached to the tip body 101. In some embodiments, the tip body 101 is typically formed as an injection-molded structure that therefore defines injection features 149, 151, 153. Example materials from which the tip body 101 may be molded include one or more of polybutylene terephthalate (PBT), nylon, and polycarbonate. The tip body 101 includes an end portion 105 that defines an attachment surface 107 to which the expandable member 103 is bonded and an insertion shaft 109 that extends from the end portion 105 into the central lumen 120 of the shaft 102. The end portion 105 includes a support body 121 with a substantially cylindrical shape and a round cap 123 with a substantially hemispherical (e.g., dome) shape that is located distal to the support body 121.

The insertion shaft 109 includes a central rod 111 and several circumferential features that extend around a majority of a circumference of the central rod 111. For example, the insertion shaft 109 further includes a distal shoulder 113 located adjacent the end portion 105, a wall section 115 that extends axially from the distal shoulder 113, and a proximal base 117 that is axially spaced apart from the wall section 115. The distal shoulder 113 and the proximal base 117 are sized to form circumferential slip fits with an inner surface of the shaft 102 That is, an outer diameter of the distal shoulder 113 and the proximal base 117 are slightly less than the inner diameter of the shaft 102. The wall section 115 is recessed radially with respect to the distal shoulder 113 and the proximal base 117 such that the wall section 115 does not contribute to the slip fit. Furthermore, the distal shoulder 113 provides an abutment surface against which the distal portion 110 of the shaft 102 is abutted in a non-hermetically sealed configuration.

The distal shoulder 113 and the wall section 115 together define two elongate gaps on opposite sides of the insertion shaft 109 that form distal fluid channels 119, while the proximal base 117 defines two elongate gaps that form proximal fluid channels 129. The fluid channels 119, 129 provide openings in the circumferential slip fits between the inner surface of the shaft 102 and the insertion shaft 109 to permit fluid flowing within the shaft 102 from the handle assembly 112 to exit the shaft 102 at the distal shoulder 113 of the insertion rod 109. The distal fluid channels 119 are angularly offset from the proximal fluid channels 129 to define part of the fluid path that opens at both ends of the insertion shaft 109. For example, fluid can flow distally through the proximal fluid channels 129, along the central rod 111, and through the distal fluid channels 119 to flow out of the shaft 102 along the distal shoulder 113. Fluid flowing out of the shaft 102 is contained by and causes expansion of the expandable member 103.

With the insertion shaft 109 disposed in the shaft 102 and with the shaft 102 positioned against the distal shoulder 113, mechanical interlocks 143 in the form of crimps may be applied to the shaft 102 at an axial location that is distal to the proximal base 117. The mechanical interlocks 143 are located on opposite sides of the shaft 102 and interfere with (e.g., dig into) the insertion shaft 109 to secure the distal tip 108 to the shaft 102. The mechanical interlocks 143 are circumferentially offset from the proximal fluid channels 129 so as not to block fluid from flowing distally through the proximal fluid channels 129.

Figure 5:
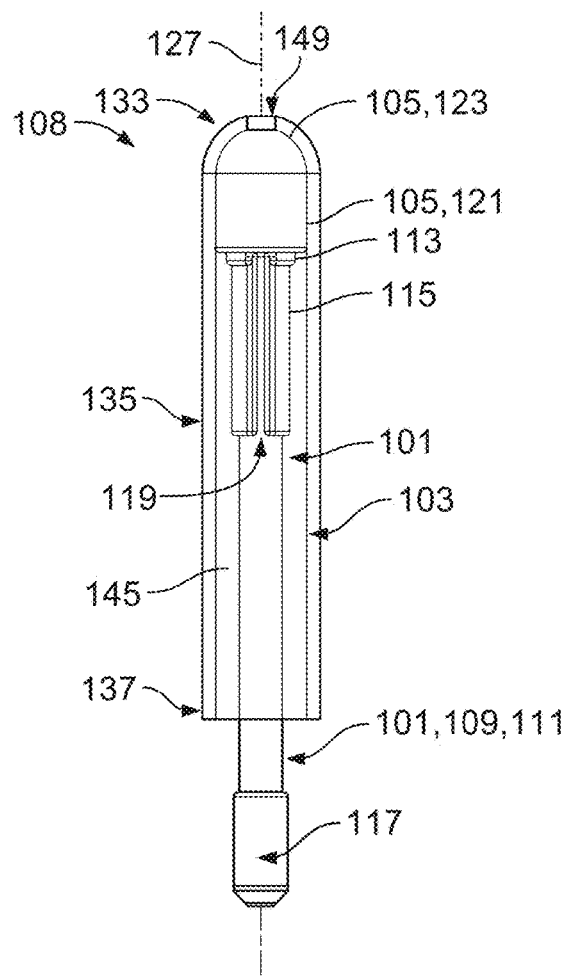
FIG. 5 is a side view of the distal tip of the uterine manipulator of FIG. 1 with the expandable member in the collapsed configuration.
Figure 6:
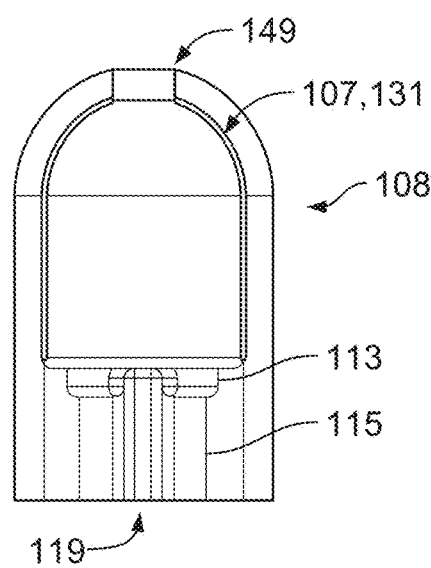
FIG. 6 is an enlarged side view of a distal end region of the distal tip of FIG. 5.
Figure 10:
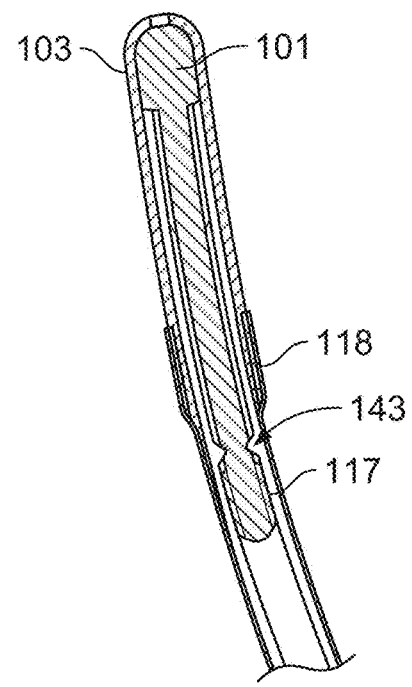
FIG. 10 is an enlarged cross-sectional view of the distal end region of FIG. 9.

Referring particularly to FIGS. 5 and 6, the expandable member 103 is attached to the tip body 101 of the distal tip 108 at a chemical bond 131 along the attachment surface 107. Accordingly, the chemical bond 131, and hence, a distal portion 133 of the expandable member 103 have a substantially hemispherical (e.g., dome) shape. The expandable member 103 includes a central portion 135 that extends from the distal portion 133, and the expandable member 103 terminates at a proximal end region 137. The central portion 135 and the proximal end region 137, together with the insertion shaft 109, define a substantially annular interior region 145 of the expandable member 103 in which the distal portion 110 of the shaft 102 is inserted. Accordingly, the expandable member 103 is arranged over the distal portion 110 of the insertion shaft 102 and has a substantially U-shaped cross-sectional profile, as shown in FIGS. 5, 10, and 12.

Figure 9:
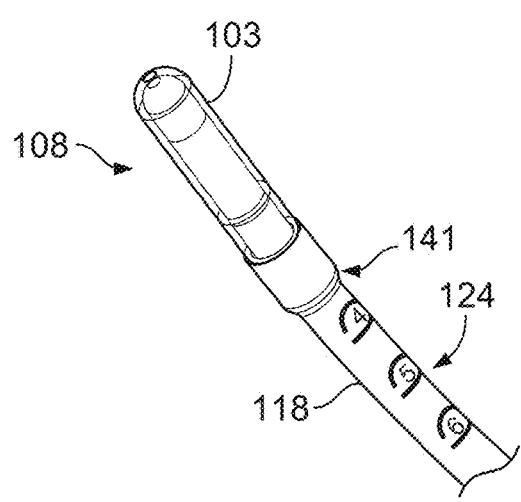
FIG. 9 is an enlarged perspective view of a distal end region of the uterine manipulator of FIG. 1 with the expandable member in the collapsed configuration.
Figure 11:
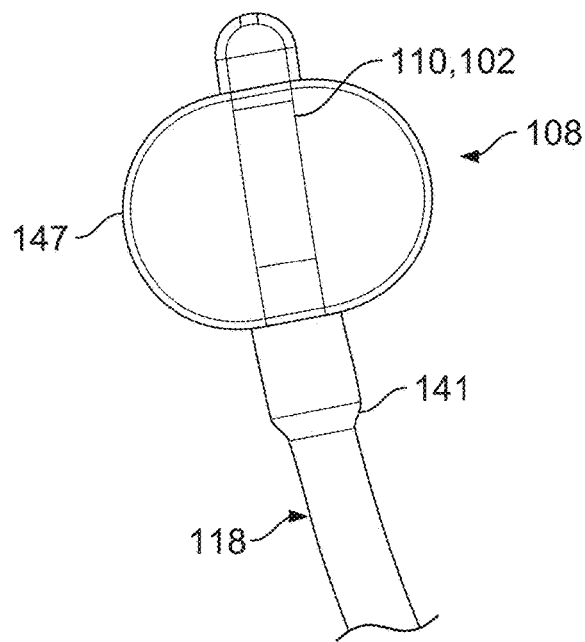
FIG. 11 is an enlarged perspective view of the distal end region of FIG. 9 with the expandable member in the expanded configuration.
Figure 12:
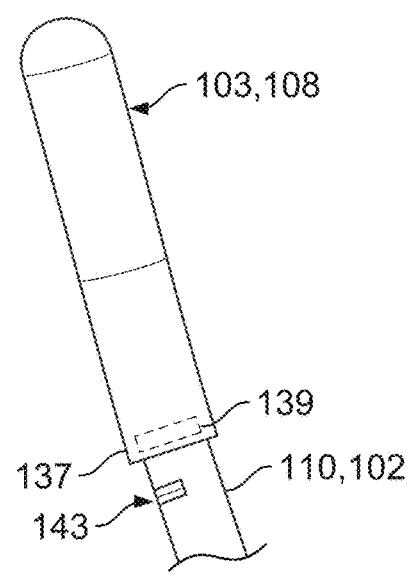
FIG. 12 is an enlarged perspective view of the distal end region of FIG. 9 with the expandable member in the collapsed configuration and omitting a shrink tube of the uterine manipulator.

Referring particularly to FIG. 12, an adhesive (e.g., glue) is applied circumferentially between the distal portion 110 of the shaft 102 and the proximal end region 137 to form a joint 139 (e.g., a glue joint) that in part secures the expandable member 103 to the shaft 102. Referring to FIGS. 9-11, the shrink tube 118 surrounds the proximal end region 137 and part of the central portion 135 of the expandable member 103 to further secure the expandable member 103 to the shaft 102. Placement of the shrink tube 118 around the expandable member 103 imparts a circumferential distal shoulder 141 to the shrink tube 118.

The expandable member 103 is an over-molded structure that is made of an elastomer material. Accordingly, the chemical bond 131 is an over-molded bond that is created during manufacture of the uterine manipulator 100 as the expandable member 103 is formed onto the tip body 101 of the distal tip 108. Due to its material formulation, the expandable member 103 forms an inflatable balloon 147 that inflates radially into an expanded configuration along the central portion 135 when air that exits the shaft 102 at the distal shoulder 113 is captured between the expandable member 103 and an exterior surface of the shaft 102. The expandable member 103 can be deflated upon withdrawal of air at the fluid line 138 of the handle assembly 112. A smooth surface of the expandable member 103 that snuggly covers the end portion 105 of the tip body 101 and the dome shape of the end portion 105 together provide the distal tip 108 with an atraumatic profile that allows the uterine manipulator 100 to be inserted into the patient without damaging tissues of the vaginal cavity, cervix, or uterus.

In some embodiments, the expandable member 103 is made of a medical grade silicone material. In other embodiments, the expandable member 103 may be made of one or more other materials, such as PVC or an elastomeric material (e.g., a TPE). The over-molded design of the expandable member 103 advantageously enables the expandable member 103 to be securely attached to the tip body 101 of the distal tip 108 with only a single seal that is provided by the chemical bond 131. Furthermore, the chemical bond 131 can withstand a higher pressure than can the expandable member 103, such that the chemical bond 131 does not contribute to failure at the distal tip 108. For example, in some embodiments, the chemical bond 131 can withstand a pressure in a range of about 75.8 kPa to about 96.6 kPa, while the expandable member 103 has a burst pressure in a range of about 75.8 kPa to about 96.6 kPa. In contrast, conventional distal tip designs of uterine manipulators often require multiple glue joints for securing a distal expandable member to a shaft. Application of such glue joints is typically difficult to automate and also difficult to carry out in a manual assembly process in a repeatable and reliable manner. Therefore, glue joints are common failure points (e.g., leak points) for conventional balloon tip designs.

In some embodiments, the tip body 101 of the distal tip 108 has a total length of about 3.0 cm to about 5.6 cm (e.g., about 4.3 cm). In some embodiments, the end portion 105 of the tip body 101 (e.g., defining a maximum width of the tip body 101) typically has a maximum diameter of about 0.48 cm to about 0.54 cm (e.g., about 0.51 cm) and a length of about 0.51 cm to about 0.76 cm (e.g., about 0.67 cm). In some embodiments, the distal shoulder 113 and the proximal base 117 have a diameter of about 0.30 cm to about 0.33 cm (e.g., about 0.32 cm), which is sized to provide the slip fit with the inner surface of the distal portion 110 of the shaft 102. In some embodiments, the distal shoulder 113 has an axial length of about 0.51 mm to about 1.00 mm (e.g., about 0.76 mm).

In some embodiments, the distal fluid channels 119 (e.g., defined by the distal shoulder 113 and the wall section 115) have a length of about 0.3 cm to about 1.9 cm (e.g., about 1.0 cm). In some embodiments, the proximal fluid channels 129 have a length of about 0.25 cm to about 1.30 cm (e.g., about 0.64 cm). In some embodiments, the two distal fluid channels 119 are spaced about 180 degrees apart from each other. In some embodiments, the two proximal fluid channels 129 are spaced apart from each other by about 45 degrees to about 180 degrees (e.g., about 90 degrees).

In some embodiments, the expandable member 103 has a thickness of about 0.51 mm to about 1.00 mm (e.g., about 0.84 mm). In some embodiments, the expandable member 103 has a total length of about 2.4 cm to about 2.8 cm (e.g., about 2.6 cm). In some embodiments, the inflatable balloon 147 has a generally doughnut-shaped profile. In some embodiments, the inflatable balloon 147 has a maximum diameter (e.g., oriented perpendicular to the central axis 127 of the tip body 101) of about 1.5 cm to about 2.8 cm (e.g., about 2.0 cm). In some embodiments, the balloon 147 has an axial length of about 2.8 cm to about 4.0 cm (e.g., about 3.4 cm).

The uterine manipulator 100 may be used in a number of procedures that require manipulation of the uterus, including surgical procedures, such as hysterectomies. In one example, the uterine manipulator 100 is used in a total laparoscopic hysterectomy (TLH) surgery. A patient is prepared for TLH surgery according to know procedures. Such procedures can include determining a depth of the uterus (e.g., as measured from the fundus of the uterus to the cervical os) using a sounding device or an ultrasound technique. For example, a sounding device that has ruler markings along its length may be inserted into the patient until a distal end is positioned adjacent the fundus of uterus according to visual confirmation of the depth reading at the cervix. The ruler marking located at the depth of the uterus (i.e., at the proximal end of the cervix) indicates the location where the colpotomizer cup 146 of the colpotomizer assembly 104 should be placed during the surgical procedure. In other words, the depth of the uterus corresponds to an operational position of the colpotomizer cup 146 for carrying out the procedure.

Figure 13:
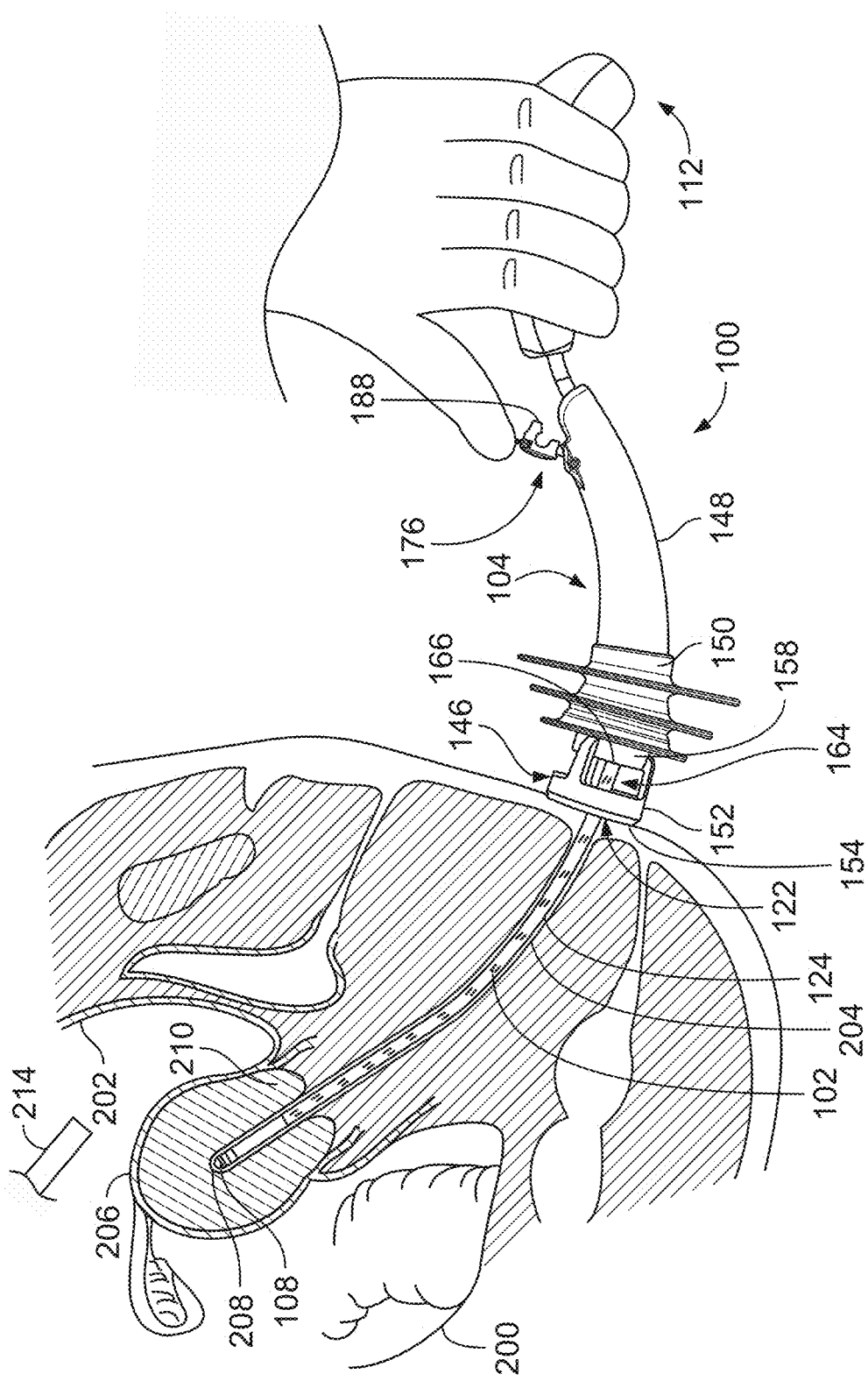
FIG. 13 is a cross-sectional side view of a pelvic cavity showing the uterine manipulator of FIG. 1 in a fully inserted position, with the expandable member of the distal tip in a collapsed configuration, and with the colpotomizer assembly in a loading position.
Figure 14:
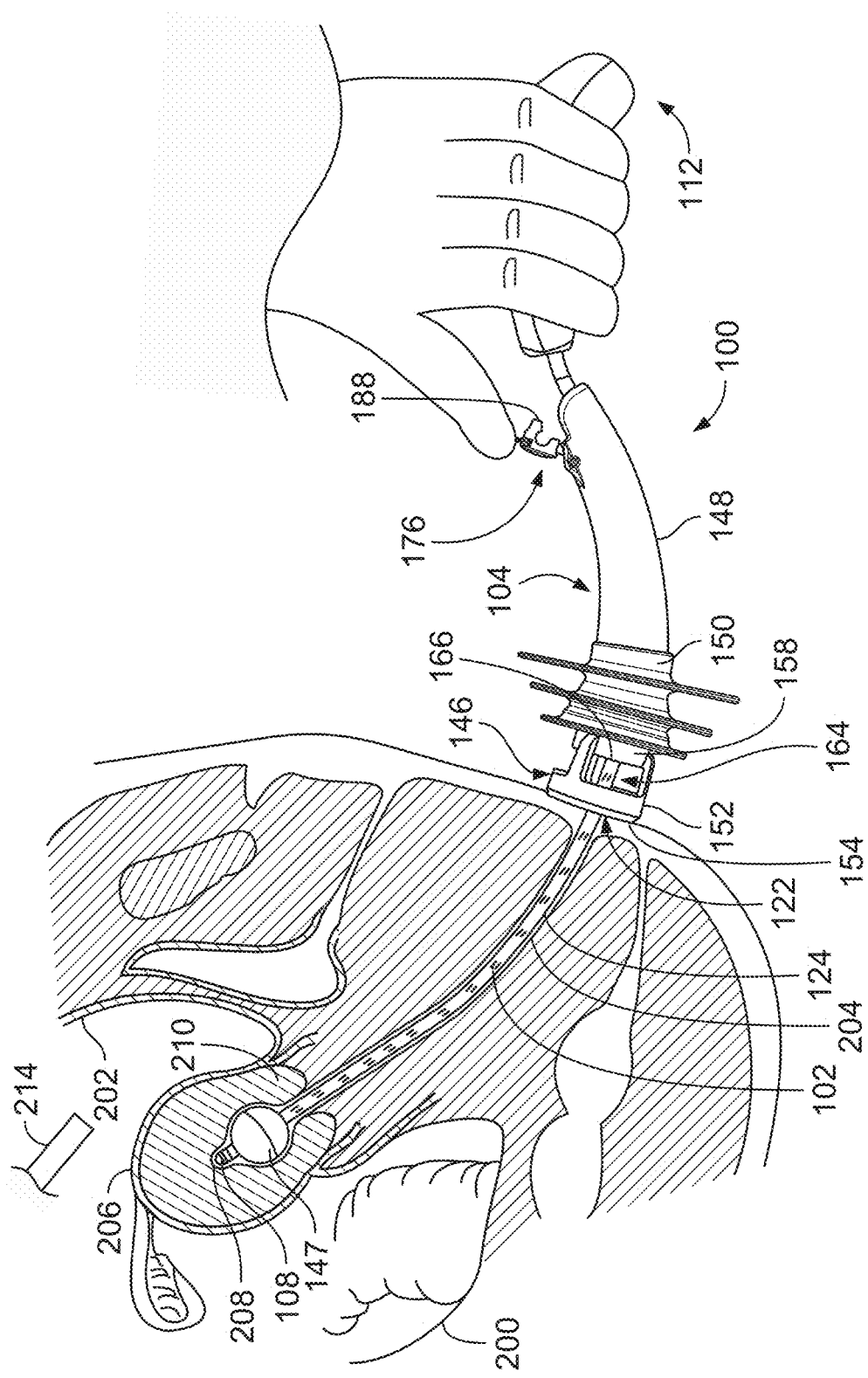
FIG. 14 is a cross-sectional side view of the pelvic cavity of FIG. 13, showing the uterine manipulator of FIG. 1 in a fully inserted position, with the expandable member in the expanded configuration, and with the colpotomizer assembly unlocked in the loading position.
Figure 15:
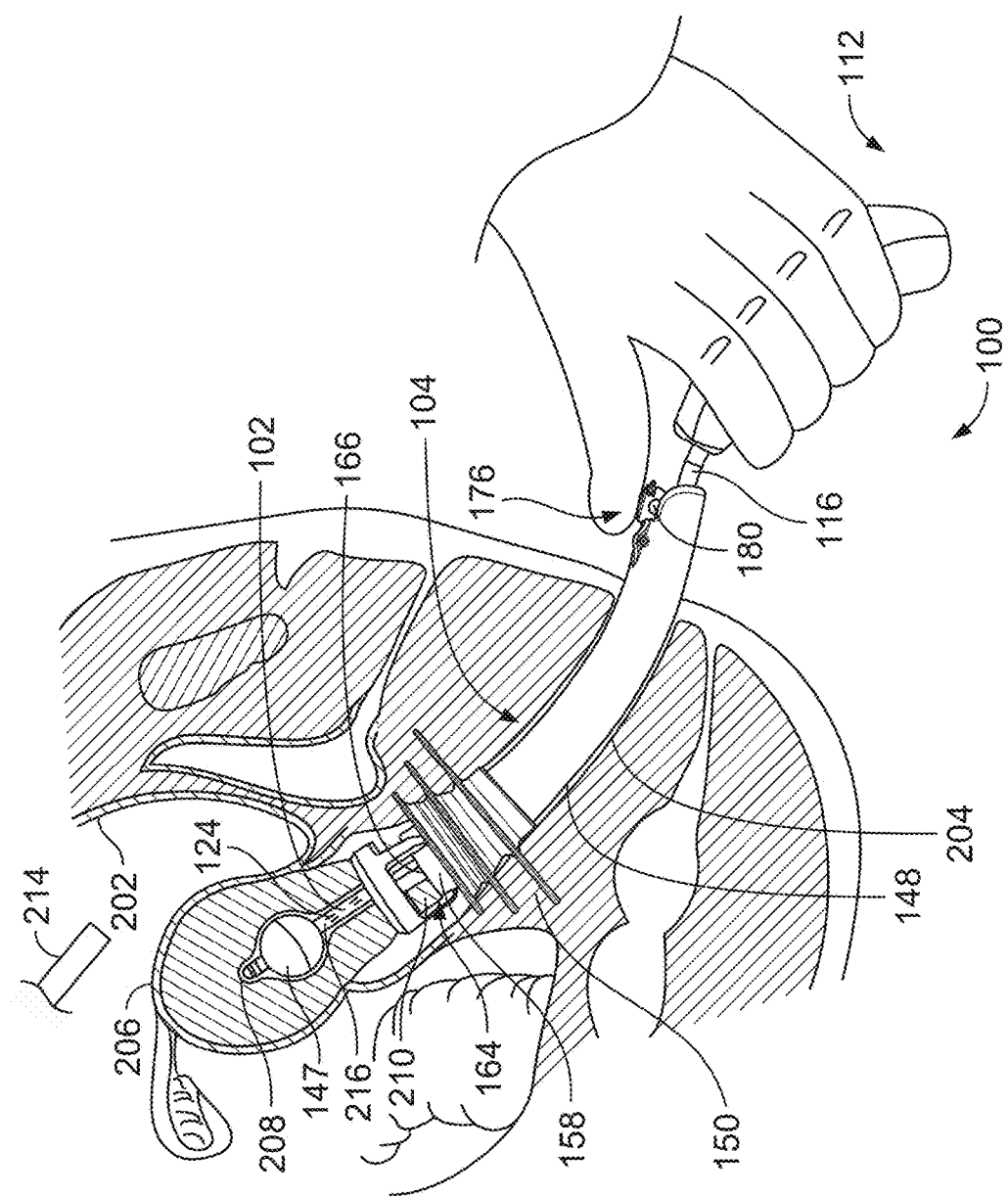
FIG. 15 is a cross-sectional side view of the pelvic cavity of FIG. 13, showing the uterine manipulator of FIG. 1 fully inserted, with the expandable member in the expanded configuration, with the colpotomizer assembly locked in an operational position, and with the uterine manipulator of FIG. 1 supporting a uterus.

FIGS. 13-15 illustrate a method of using the uterine manipulator 100. Referring particularly to FIG. 13, once prepared, the patient's peritoneal cavity 200 is inflated with a gas (e.g., $CO_2$) to facilitate accessibility and visibility of the female pelvic organs and surgical instruments (e.g., a laparoscope 214) as the instruments are inserted through the abdominal wall 202 and into the peritoneal cavity 200. The colpotomizer assembly 104, while in an unlocked configuration, is slid proximally along the shaft 102 until the colpotomizer assembly 104 reaches a loading position (e.g., a position where the proximal end of the sleeve 148 is positioned along the proximal portion 114 of the shaft 102). The uterine manipulator 100 is then inserted into the vaginal cavity 204. In some cases, the colpotomizer assembly 104 is locked in the loading position prior to insertion into the vaginal cavity 204. In other instances, the colpotomizer assembly 104 remains unlocked in the loading position during insertion into the vaginal cavity 204.

Referring to FIG. 14, the uterine manipulator 100 is moved distally within the vaginal cavity 204 until the distal tip 108 of the shaft 102 is positioned adjacent the fundus 208 of the uterus. A fluid (e.g., air) is then supplied to the fluid line 138 within the handle 144 to inflate the balloon 147 such that the balloon 147 engages an interior surface of the uterus 206. In some cases, fluid may be withdrawn through the fluid line 138 to deflate the balloon 147 if it is determined that the uterine manipulator 100 needs to be repositioned. Leaving the colpotomizer assembly 104 in the loading position during insertion of the uterine manipulator 100 can allow for a relatively unobstructed view of the cervix 210 to help ensure proper placement of the distal tip 108.

Referring to FIG. 15, the colpotomizer assembly 104 (still in the unlocked configuration) is advanced distally from the loading position until the ruler markings 124 indicate that the base 158 of the colpotomizer cup 146 is positioned at an operational position (i.e., at a distance from the distal tip 108 that is approximately equal to the depth of the uterus 206 as determined from the sounding device). The viewing windows 164 of the colpotomizer cup 146 can provide for additional visual confirmation of placement. In the operational position, the cervix 210 is positioned within the body 152 of the colpotomizer cup 146 and abuts the base 158 of the colpotomizer cup 146. The ability to view placement of the cervix 210 within the colpotomizer cup 146 through the viewing windows 164 helps to ensure that the colpotomizer cup 146 is fully forward in the desired position relative to the distal tip 108 of the shaft 102 and relative to the cervix 210. In this position, the colpotomizer cup 146 provides an anatomical landmark at the base of the uterus 206 (e.g., indicating a location of an apex of the cervix 210) and an incision backstop (e.g., an edge that defines where the uterus 206 should be cut). Furthermore, the cup face 122 of the colpotomizer cup 146 is centered on the arch centerline 199 of the shaft 102, ensuring a proper angular position of the colpotomizer cup 146 with respect to the shaft 102 for providing a desirable or suitable cutting guide.

With the colpotomizer assembly 104 positioned as desired, the jaw 188 of the thumb lock 176 is then depressed to lock the colpotomizer assembly 104 at the operational position. The jaw 188 can be depressed using the same hand that advances the colpotomizer assembly 104 within the vaginal cavity 204, such that distal movement and locking of the colpotomizer assembly 104 can be performed in a one-handed operation. If necessary, the lift flange 192 of the thumb lock 176 can be pushed upwards to unlock the colpotomizer assembly 104 for repositioning along the shaft 102. In some implementations, the mechanical integrity of the thumb lock 176 may be maintained over multiple (e.g., four) lock-unlock cycles. With the colpotomizer assembly 104 locked in the desired operational position along the shaft 102, the vaginal occluder 150 seals a distal region of the vaginal cavity 204, thereby maintaining pneumoperitoneum. In this manner, the vaginal occluder 150 prevents the escape of gas used to inflate the peritoneal cavity 200 during and following the first of any colpotomy incisions.

A surgeon can then manipulate or move the uterus 206 into a desired position to perform surgical procedures that include cutting around the base of the uterus 206. After the uterus 206 is completely incised such that the uterus 206 is totally free in the peritoneal cavity 200 and held only by the uterine manipulator 100, then the balloon 147 is deflated, and the uterine manipulator 100 is withdrawn from the patient through the vaginal cavity 204. The uterus 206 is subsequently removed from the patient according to conventional protocols. The uterine manipulator 100 can be disposed of following the surgery.

While the uterine manipulator 100 has been described and illustrated with respect to certain dimensions, sizes, shapes, arrangements, materials, components, and methods, in some embodiments, a uterine manipulator that is otherwise substantially similar in construction and function to the uterine manipulator 100 may include one or more different dimensions, sizes, shapes, arrangements, configurations, materials, and components, or may be utilized according to different methods.

For example, while the distal tip 108 has been described and illustrated as having a substantially dome-shaped distal region, in some embodiments, a uterine manipulator may include a distal tip that is otherwise substantially similar in construction and function to the distal tip 108, except that the distal tip has a different shape, such as a conical shape or a cylindrical shape.

While the body of the distal tip 108 has been described as a rigid member, in some embodiments, a uterine manipulator may include a distal tip that is otherwise substantially similar in construction and function to the distal tip 108, except that the distal tip alternatively has a flexible body to which the expandable member is attached.

While the distal tip 108 has been described and illustrated as being attached to the distal portion 110 of the shaft 102 with mechanical interlocks 143 in the form of crimps, in some embodiments, a uterine manipulator may include a distal tip that is otherwise substantially similar in construction and function to the distal tip 108, except that the distal tip is formed to be attached to the distal portion 110 of the shaft 102 with a different fastening or coupling feature, such as a threaded profile, an expandable barb, or a clip.

While the distal tip 108 has been described and illustrated as including an expandable member 103 that is secured at a proximal end 137 to the distal portion 110 of the shaft 102 with a glue joint 139, in some embodiments, a uterine manipulator with a distal tip that is otherwise substantially similar in construction and function to the distal tip 108 may alternatively include an expandable member that is secured at a proximal end to the shaft with a different type of fastener, joint, or joining mechanism, such as ultrasonic welding, spin welding, heat staking, or threading.

Furthermore, in some embodiments, the thumb lock 176 of the colpotomizer assembly 104 may be equipped with a lens (e.g., a convex lens) adjacent the lift flange 192 that magnifies the ruler markings 124 printed along the shaft 102. The focal point of the lens may be selected such that a ruler marking 124 substantially fills the viewing window of the lens. Such magnification can assist the user of the uterine manipulator 100 in visualizing the ruler markings 124 to determine the position of the colpotomizer assembly 104 along the shaft 102.

Figure 17:
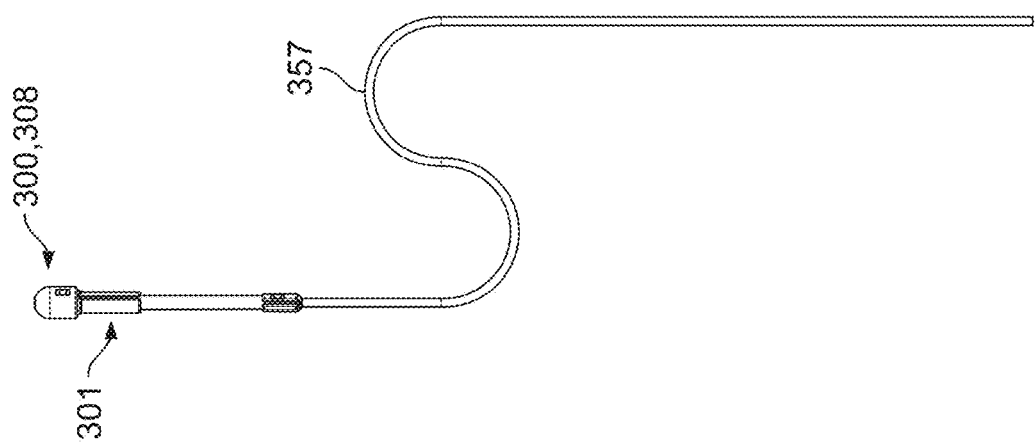
FIG. 17 is a side perspective view of the distal tip of FIG. 16.
Figure 16:
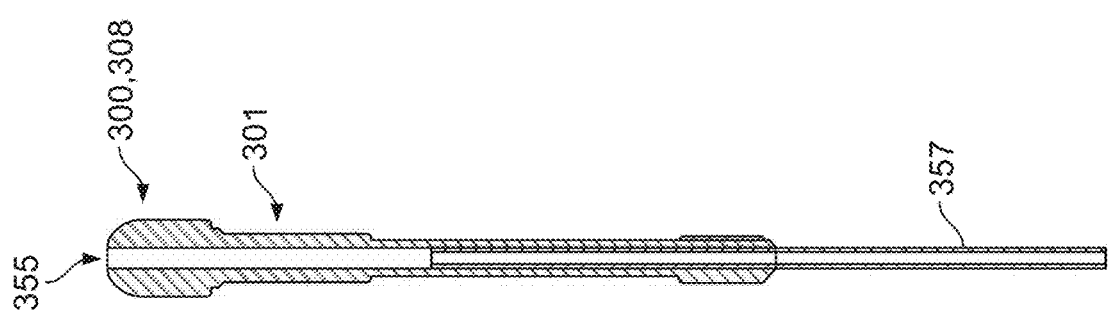
FIG. 16 is a side cross-sectional view of a distal tip that includes a through channel.

FIGS. 16 and 17 illustrate an elongate tip body 301 of a distal tip 308 of a uterine manipulator 300. The distal tip 308 is substantially similar in construction and function to the distal tip 108, except that the distal tip 308 includes a through channel 355 for delivering fluid to a patient's uterus. Accordingly, the distal tip 308 includes the expandable member 103 (omitted from FIGS. 16 and 17 for clarity) and is equipped with a fluid line 357. The fluid line 357 extends within a shaft of the uterine manipulator 300 from a handle assembly of the uterine manipulator 300 to the through channel 355. Within the handle assembly, a proximal end of the fluid line 357 is connectable to a fluid source for providing the fluid. The uterine manipulator 300 may be otherwise substantially similar in construction and function to the uterine manipulator 100. In some examples, the uterine manipulator 300 may be utilized to deliver fluid to the uterus during a chromopertubation procedure or another procedure. In some embodiments, the distal tip 308 may be included as part of a different surgical tool that is not a uterine manipulator.

Figure 18:
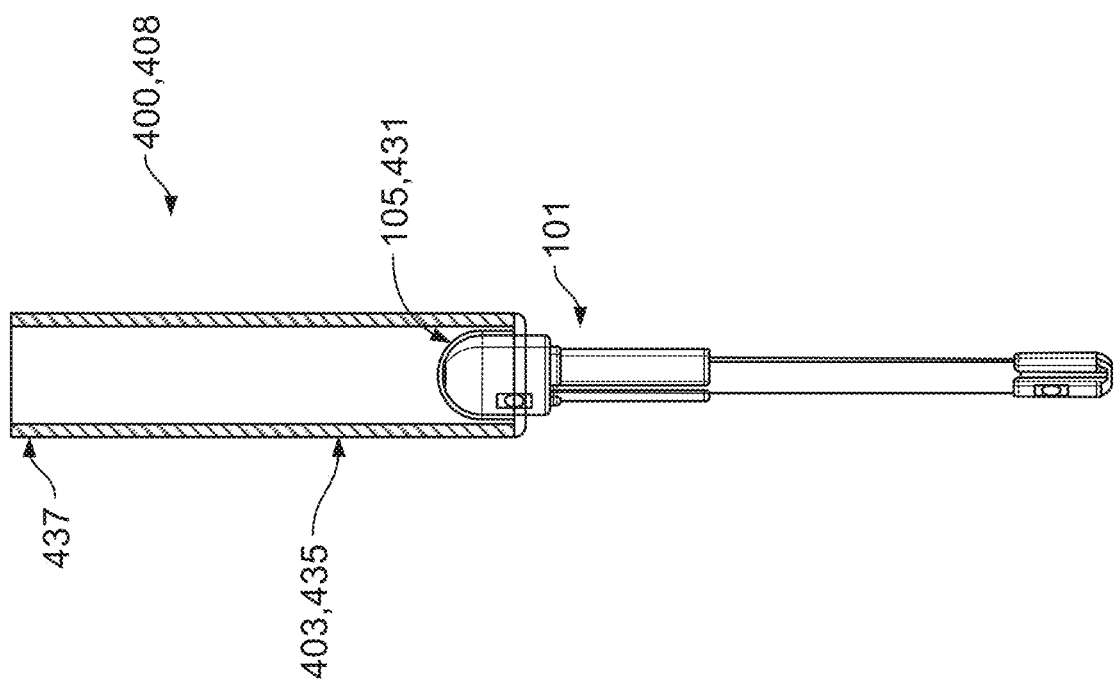
FIG. 18 is a side perspective view of a distal tip that includes an expandable member with an initially inverted configuration.

FIG. 18 illustrates a distal tip 408 of a uterine manipulator 400. The distal tip 408 is substantially similar in construction and function to the distal tip 108, except that an expandable member 403 of the distal tip 408 is initially provided in an inverted shape. Accordingly, the distal tip 408 includes the elongate tip body 101 of the distal tip 108, and the expandable member 403 is securely attached to the end portion 105 of the tip body 101 along a chemical bond 431, while a central portion 435 and a proximal end region 437 of the expandable member 403 are positioned inside-out above the end portion 105 to form an inverted configuration.

The inverted configuration improves ease of access to the insertion shaft 109 of the tip body 101 and the distal portion 110 of the shaft 102 of the uterine manipulator 400 to facilitate mechanical attachment of the distal tip 408 to the shaft 102 using a mechanical interlocking feature (e.g., such as the mechanical interlocks 143 or another type of fastening feature). Once the insertion shaft 109 is securely positioned within the shaft 102, then the central portion 435 and proximal end region 437 of the expandable member 403 can be rolled downward (e.g., proximally) over the distal end 110 of the shaft 102 and secured to the shaft 102 with a glue joint, and the shrink tube 118 may be placed over a portion of the expandable member 403, as discussed above with respect to the uterine expandable member 103 of the distal tip 108. Therefore, aside from the distal tip 408, the uterine manipulator 400 may be otherwise substantially similar in construction and function to the uterine manipulator 100.

Figure 19:
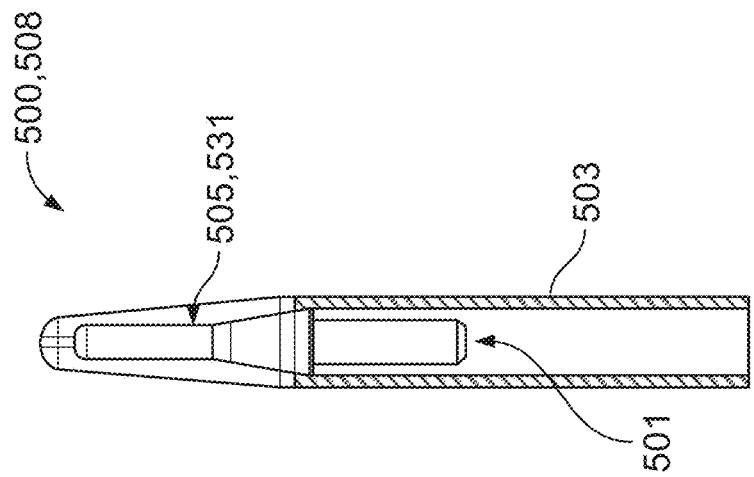
FIG. 19 is a side view of a distal tip with a conical-shaped end region.

FIG. 19 illustrates a distal tip 508 of a uterine manipulator 500. The distal tip 508 is similar in construction and function to the distal tip 108, except that the distal tip 508 has a generally tapered (e.g., conical) distal end region. As described above with respect to the distal tip 108, the distal end region of the distal tip 508 forms a smooth, atraumatic surface. The distal tip 508 includes an elongate tip body 501 that is designed to form a slip fit with an inner surface of the shaft 102 of the uterine manipulator 500 and an over-molded expandable member 503 that is securely attached to an end portion 505 of the tip body 501 along a chemical bond 531. The uterine manipulator 500 may be otherwise substantially similar in construction and function to the uterine manipulator 100.

A uterine manipulator that is similar in construction and function to the uterine manipulator 100 may also include modifications to components other than the distal tip 108. For example, while the uterine manipulator 100 has been described as including the fluid line 138 that can be coupled to a fluid source, in some embodiments, a uterine manipulator may alternatively include an integral syringe.

While the locking mechanism of the colpotomizer assembly 104 is described as being located at the proximal end of the sleeve 148, in other embodiments, a locking mechanism may be located a different location (e.g., at an intermediate location) along a length of a colpotomizer assembly.

While a specific configuration of a one-handed cam-based locking mechanism has been described, other alternative types of locking mechanisms can be used. In certain embodiments, for example, a uterine manipulator may include a different type of one-handed cam-based locking mechanism. Such example locking mechanisms may include a screen door mechanism, a Touhy Borst mechanism, or a sheet metal skive capture mechanism.

While the colpotomizer assembly 104 has been described as including a one-handed locking mechanism, in some embodiments, a uterine manipulator may include a colpotomizer assembly that has a two-handed locking mechanism.

While the uterine manipulator 100 has been described as disposable, in some embodiments, the uterine manipulator 100 may be designed to be reusable (e.g., sterilizable).

While the distal tips 108, 308, 408, 508 have been described and illustrated as being a part of a uterine manipulator, in some embodiments, any of the distal tips 108, 308, 408, 508 may be assembled as part of a different type of surgical tool, such as hysteroscopy cannulas or various types of catheters.

Other embodiments are also within the scope of the following claims.

What is claimed is:

1. A distal tip of a surgical tool, the distal tip comprising:
   a tip body comprising:
     a distal end portion defining an attachment surface, and
     an elongate member configured to be inserted within a tubular shaft of the surgical tool and defining a recessed channel that terminates at the distal end portion, wherein the elongate member defines:
       a first annular sidewall sized to be inserted into the tubular shaft to form a first slip fit with an inner surface of the tubular shaft, and
       a second annular sidewall spaced longitudinally apart from the first annular sidewall such that the first and second annular sidewalls are separate from each other, the second annular sidewall being sized to be inserted into the tubular shaft to form a second slip fit with the inner surface of the tubular shaft; and
   an expandable member extending around the tip body, being secured to the attachment surface with a chemical bond, and being adjustable between:
     an expanded configuration in which at least a portion of the expandable member extends radially outward from the tip body, and
     a collapsed configuration in which at least the portion of the expandable member is oriented substantially parallel to the tip body.

2. The distal tip of claim 1, wherein the expandable member comprises an overmolded structure.

3. The distal tip of claim 2, wherein the expandable member comprises silicone.

4. The distal tip of claim 2, wherein the chemical bond comprises an overmolded bond.

5. The distal tip of claim 1, wherein the expandable member comprises an elastomeric material.

6. The distal tip of claim 1, wherein the expandable member comprises a thermoplastic elastomer (TPE) material.

7. The distal tip of claim 1, wherein the distal end portion defines an atraumatic profile.

8. The distal tip of claim 1, wherein the attachment surface has a round shape.

9. The distal tip of claim 1, wherein the expandable member comprises an inflatable balloon.

10. The distal tip of claim 1, wherein the expandable member and the tip body together define an annular interior region sized to accommodate a distal portion of the tubular shaft.

11. The distal tip of claim 1, wherein the expandable member has a U-shaped cross-sectional profile in the collapsed configuration.

12. The distal tip of claim 1, wherein the first annular sidewall at least in part defines the recessed channel.

13. The distal tip of claim 12, wherein the first annular sidewall forms an abutment surface against which a distal portion of the tubular shaft is positioned at an end of the recessed channel.

14. The distal tip of claim 12, wherein the recessed channel comprises a first recessed channel, and wherein the second annular sidewall at least in part defines a second recessed channel.

15. The distal tip of claim 14, wherein the second recessed channel is angularly offset from the first recessed channel and spaced axially apart from the first recessed channel.

16. The distal tip of claim 1, wherein the elongate member of the tip body further defines a rod that extends between the first and second annular sidewalls, and wherein a diameter of the rod is less than a first diameter of the first annular sidewall and less than a second diameter of the second annular sidewall.

17. The distal tip of claim 16, wherein the first diameter is equal to the second diameter.

18. The distal tip of claim 1, wherein the recessed channel is oriented parallel to a central axis of the tip body.

19. The distal tip of claim 1, wherein the tip body defines an axial through channel.

20. The distal tip of claim 1, wherein the expandable member is invertible with respect to the attachment surface.

21. The distal tip of claim 1, wherein the distal end portion has a tapered shape.

22. The distal tip of claim 1, wherein the first annular sidewall is positioned adjacent the distal end portion of the tip body, and wherein the second annular sidewall is spaced axially apart from the distal end portion.

23. The distal tip of claim 22, wherein the first and second annular sidewalls are configured to be surrounded by the tubular shaft along an entire first length of the first annular sidewall and along an entire second length of the second annular sidewall.

24. The distal tip of claim 1, wherein a proximal end of the elongate member is located proximally to a distal end of the tubular shaft.

25. The distal tip of claim 1, wherein the distal end portion has a substantially hemispherical shape.

26. The distal tip of claim 1, wherein the attachment surface has a substantially hemispherical shape.

27. A surgical tool, comprising:
a tubular shaft; and
a distal tip secured to the tubular shaft, the distal tip comprising:
  a tip body comprising:
    a distal end portion defining an attachment surface, and
    an elongate member configured to be inserted into the tubular shaft and defining a recessed channel that terminates at the distal end portion, wherein the elongate member defines:
      a first annular sidewall sized to be inserted into the tubular shaft to form a first slip fit with an inner surface of the tubular shaft, and
      a second annular sidewall spaced longitudinally apart from the first annular sidewall such that the first and second annular sidewalls are separate from each other, the second annular sidewall being sized to be inserted into the tubular shaft to form a second slip fit with the inner surface of the tubular shaft, and
  an expandable member extending around the tip body, being secured to the attachment surface with a chemical bond, and being adjustable between:
    an expanded configuration in which at least a portion of the expandable member extends radially outward from the tubular shaft, and
    a collapsed configuration in which at least the portion of the expandable member is oriented substantially parallel to the tubular shaft.

28. A uterine manipulator, comprising:
a tubular shaft; and
a distal tip secured to the tubular shaft, the distal tip comprising:
  a tip body comprising:
    a distal end portion defining an attachment surface, and
    an elongate member configured to be inserted into the tubular shaft and defining a recessed fluid channel that terminates at the distal end portion, wherein the elongate member defines:
      a first annular sidewall sized to be inserted into the tubular shaft to form a first slip fit with an inner surface of the tubular shaft, and
      a second annular sidewall spaced longitudinally apart from the first annular sidewall such that the first and second annular sidewalls are separate from each other, the second annular sidewall being sized to be inserted into the tubular shaft to form a second slip fit with the inner surface of the tubular shaft, and
  an inflatable member extending around the tip body, being secured to the attachment surface with a chemical bond, and being adjustable between:
    an inflated configuration in which at least a portion of the inflatable member extends radially outward from the tubular shaft, and
    a deflated configuration in which at least the portion of the inflatable member is oriented substantially parallel to the tubular shaft.

29. A method of operating a surgical tool, the method comprising:
flowing a fluid distally through a tubular shaft of the surgical tool to a distal tip of the surgical tool that is secured to a distal portion of the tubular shaft;
flowing the fluid further distally along a recessed channel along an elongate member of a tip body of the distal tip, the recessed channel terminating at a distal end portion of the tip body, the elongate member being disposed within the tubular shaft, and the elongate member defining:
  a first annular sidewall positioned within the tubular shaft at a first slip fit between the first annular sidewall and an inner surface of the tubular shaft, and
  a second annular sidewall spaced longitudinally apart from the first annular sidewall such that the first and second annular sidewalls are separate from each other, the second annular sidewall being positioned within the tubular shaft at a second slip fit with the inner surface of the tubular shaft;
flowing the fluid further distally out of the tubular shaft through an opening positioned at an interface between the distal end portion of the tip body and the distal portion of the tubular shaft;
capturing the fluid with an expandable member of the distal tip, the expandable member extending around the tip body and being secured to an attachment surface on the distal end portion of the tip body with a chemical bond; and
expanding the expandable member radially outward from the tubular shaft with the fluid.

* * * * *